United States Patent [19]
Moldavsky et al.

[11] Patent Number: 5,115,463
[45] Date of Patent: May 19, 1992

[54] EXTENDED CORDLESS TELEPHONE SYSTEM

[76] Inventors: David Moldavsky, 7 Ferncliff Dr., West Hartford, Conn. 06117; Robert L. Stone, Box 83, Garland Rd., Newfield, Me. 04056

[21] Appl. No.: 543,010

[22] Filed: Jun. 25, 1990

[51] Int. Cl.$^5$ ............................................. H04M 11/00
[52] U.S. Cl. ..................................... 379/58; 379/61; 455/103; 455/55.1
[58] Field of Search ............... 379/58, 61, 63, 59; 455/80, 81, 103, 55

[56]  References Cited

U.S. PATENT DOCUMENTS

| | | | |
|---|---|---|---|
| 4,476,574 | 10/1984 | Struven | 455/55 |
| 4,639,914 | 1/1987 | Winters . | |
| 4,672,658 | 6/1987 | Kavehrad et al. . | |
| 4,697,281 | 9/1987 | O'Sullivan | 379/59 |
| 4,731,812 | 3/1988 | Akerberg . | |
| 4,741,019 | 4/1988 | Takahashi . | |
| 4,771,448 | 9/1988 | Koohgoli et al. . | |
| 4,852,148 | 7/1989 | Shibata et al. . | |
| 4,866,732 | 9/1989 | Carey et al. | 455/55 |
| 4,866,753 | 9/1989 | Fric . | |
| 4,879,740 | 11/1989 | Nagashima et al. . | |

FOREIGN PATENT DOCUMENTS

| | | | |
|---|---|---|---|
| 3415032 | 11/1984 | Fed. Rep. of Germany | 379/63 |
| 0267028 | 11/1988 | Japan | 379/61 |
| 0305694 | 12/1988 | Japan | 379/61 |
| 62-207096 | 9/1989 | Japan . | |

OTHER PUBLICATIONS

Publication: Communication U.S.A., 'The Transmitter Combiner', by J. R. Hall, pp. 30, 31 and 34, Mar. 1970.

Primary Examiner—James L. Dwyer
Assistant Examiner—Dwayne D. Bost
Attorney, Agent, or Firm—David B. Newman, Jr. & Associates

[57]  ABSTRACT

An extended cordless telephone system for communicating information signals from a plurality of telephone lines through a telephone exchange, including a central station and a plurality of remote units. The plurality of remote units may be radio telephone handsets, data sets, and the like. The central station includes a plurality of transceivers, a power combiner, a duplexer, a power divider, and a plurality of radiax cables. The plurality of transceivers transmits and receives the information signals as ACSB signals. Alternatively, the plurality of transceivers may transmit and receive the information signals as spread spectrum signals, using frequency hopping and FSK modulation. The power combiners include a plurality of combiner striplines for impedance matching the plurality of transceivers to an output of the power combiner.

16 Claims, 11 Drawing Sheets

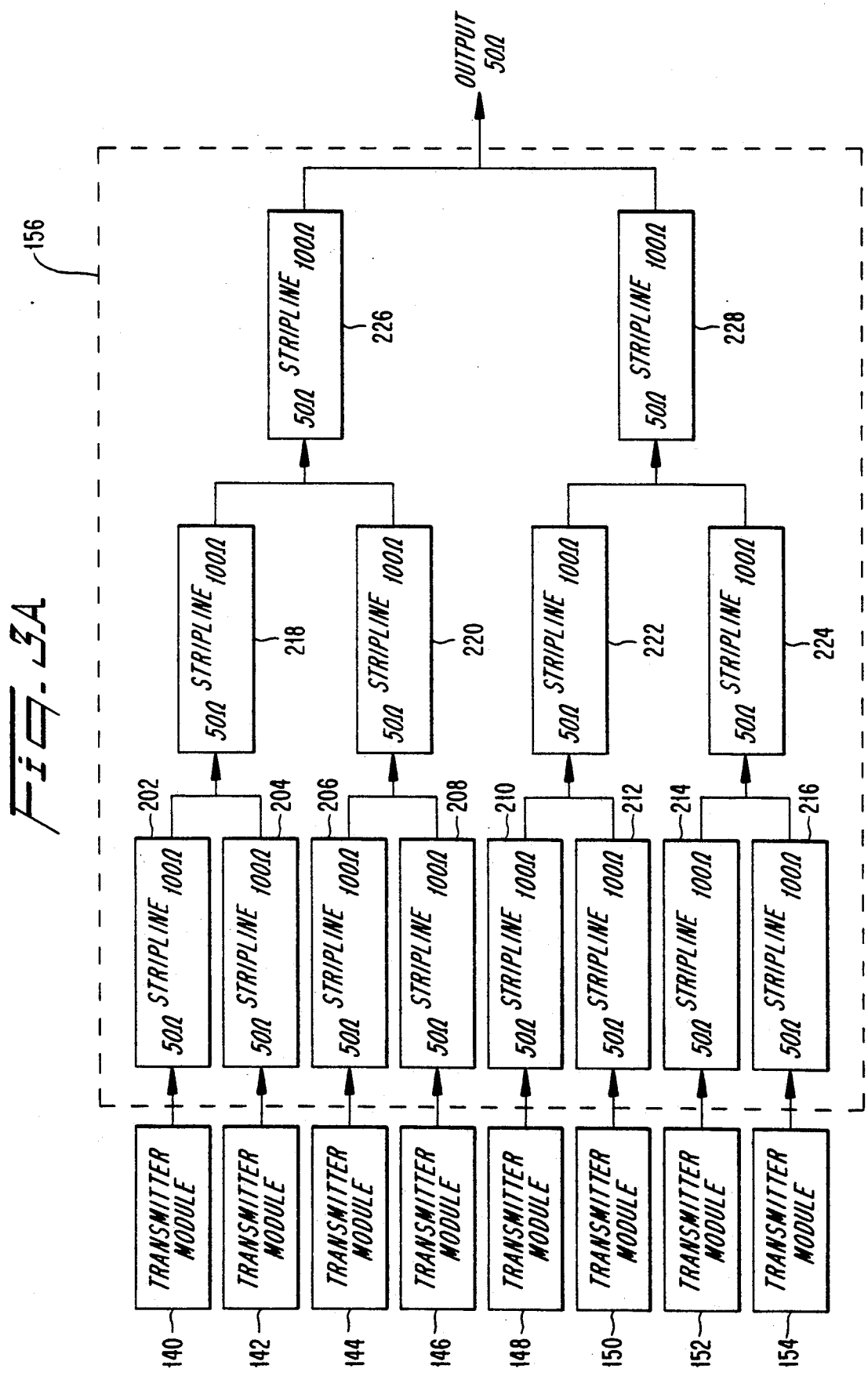

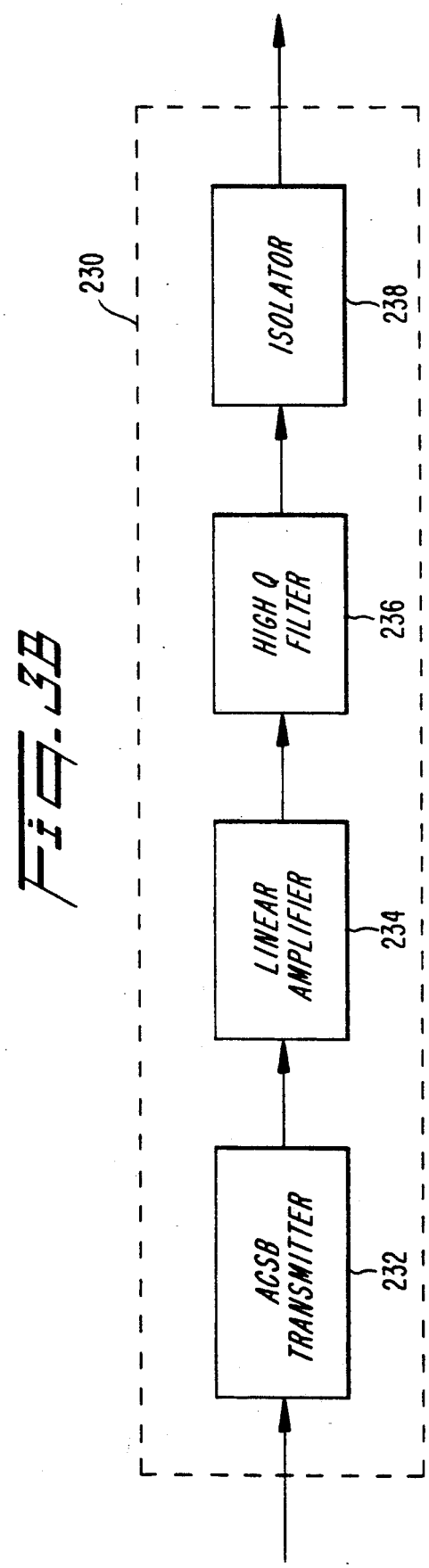

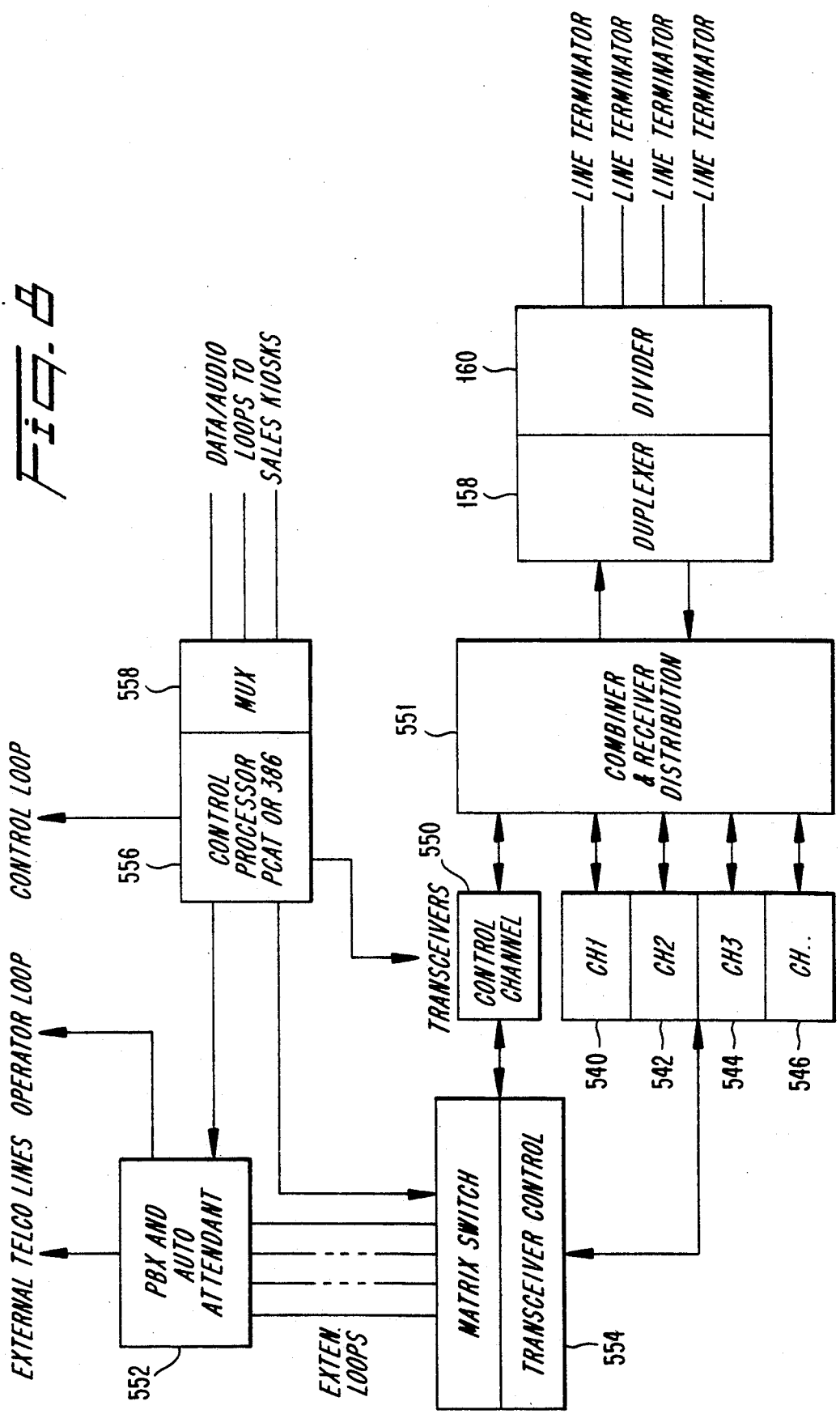

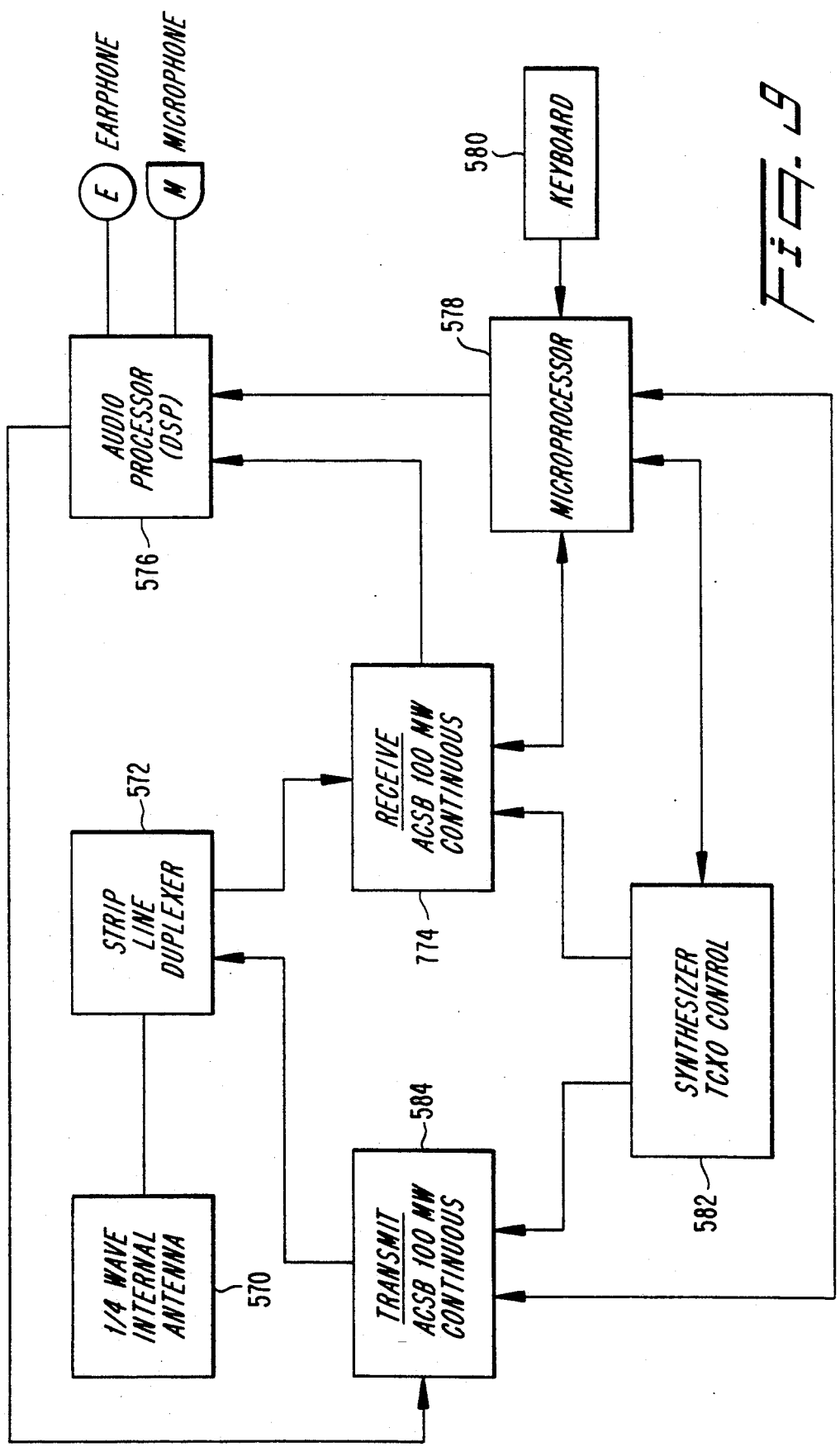

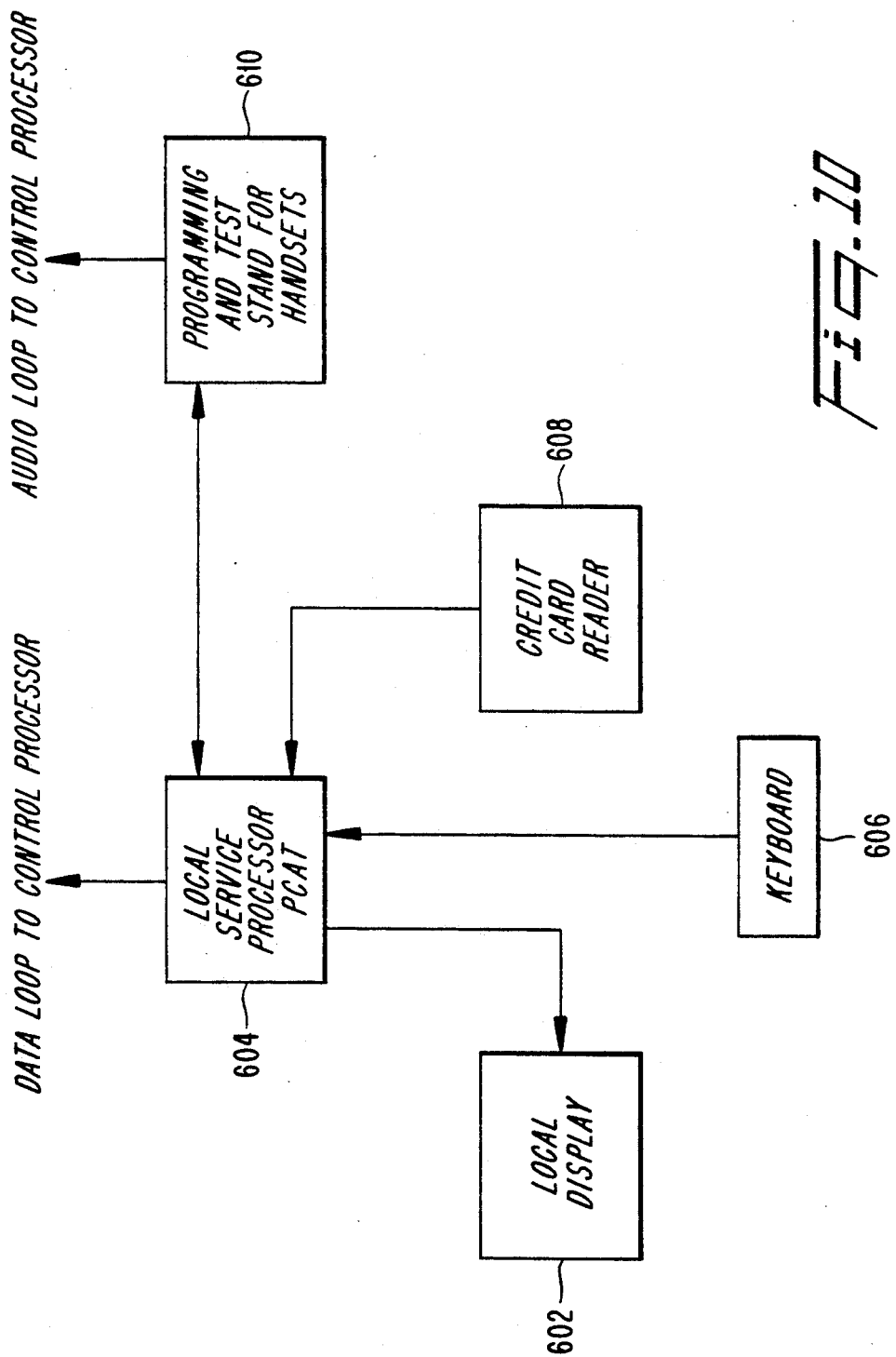

EXTENDED CORDLESS TELEPHONE SYSTEM

BACKGROUND OF THE INVENTION

This invention relates to a telephone system for use at a convention center, or the like, and more particularly to a telephone system employing a private branch exchange with radio telephone handsets.

DESCRIPTION OF THE PRIOR ART

A traditional private branch exchange (PBX) is used inside a building and has a base station comprising a switching system connected, through wiring inside the building, to a plurality of remote terminals such as telephone sets, data sets, teletypewriters, computer terminals, and the like. Because of these wired connections, removing or adding remote terminals involves expensive and time consuming wiring or rewiring. These problems can be eliminated by replacing the wiring between the base station and the remote terminals by microwave frequency signals such as is done currently for single users with cordless phones. The use of multiple cordless phones, however, is not practicable with PBX's because of problems with capacity, adjacent channel interference, and interference from other systems. Cordless phones have been allocated for a few channels by the Federal Communications Commission (FCC). Although adequate for residential use, the capacity is inadequate for buildings using PBX's. More bandwidth is allocated for cordless telephones or wireless PBX's at the 900 MHz radio band.

U.S. Pat. No. 4,639,914 to Winters discloses a wireless PBX or local area network (LAN) system which allows multiple, simultaneous users per channel for communications between a base station and a multiplicity of remote terminals by a combination of an adaptive signal processing array using optimum combination at the base station. U.S. Pat. No. 4,737,812 to Akerberg discloses a base station unit, and the use of a multiplicity of wireless telephone handsets. More than one of the base stations may be used in order to wire the handsets through a building.

Companies and people who exhibit at typical convention center facilities often desire, for one reason or another, having a telephone in their booth space. A current problem with having a telephone at each booth is that the installation costs required for telephone rental and service provided by local interconnects have made this very necessary utility almost cost prohibitive for smaller businesses that must use convention center services for their business prospecting. Also, business show attenders who find they must have access to a telephone during the business day very often find themselves waiting on long lines in front of a few over used public telephones.

A number of show exhibitors and attenders have purchased cellular telephones in an effort to obtain available and cost effective telephone service, only to learn that cellular telephones do not wort effectively in many convention center sites due to building structures and other matters.

Thus, there is a need for a communications system that in effect will allow convention-center-show exhibitors and attenders to rent very low powered cordless telephone handsets with which they can receive direct inward dialed (DID) and initiate direct outward dialed (DOD) telephone calls.

OBJECTS AND SUMMARY OF THE INVENTION

An object of the present invention is to provide an extended cordless telephone service for use in a convention center and having a large number of users.

Another object of the present invention is to provide an extended cordless telephone service using extremely low RF power, in the milliwatt range, and having all RF contained within the convention center.

A further object of the present invention is to provide an extended cordless telephone system for voice and data communications on a short term rental basis for convention exhibitors and attenders.

A still further object of the present invention is to provide an extended cordless telephone system that can operate in the UHF or microwave band, without the requirement of special licenses from the FCC.

According to the present invention, as embodied and broadly described herein, an extended cordless telephone system for communicating information signals from a plurality of telephone lines through a telephone exchange is provided, comprising a central station and a plurality of remote units. The plurality of remote units may handle data or voice, and may be embodied as radio telephone handsets, data sets, teletypewriters, computer terminals and the like.

The central station communicates information signals to and from the plurality of telephone lines and the remote units. The central station includes a plurality of transceivers, a power combiner, a duplexer, a power divider, and a plurality of radiax cables. In a first embodiment of the present invention, the plurality of transceivers transmits and receives the information signals as amplitude companded sideband (ACSB) signals. The power combiner is coupled to the plurality of transceivers, for combining the ACSB signals outputted from the plurality of transceivers. In a preferred embodiment of the invention, the power combiner includes a plurality of combiner striplines with each combiner stripline transforming an input impedance by a ratio of approximately 1:2 to an output impedance. The combiner striplines are used to impedance match the plurality of transceivers to an output of the power combiner. Typically, at least an output from a first combiner stripline and an output from a second combiner stripline are coupled to an input of a third combiner stripline.

A duplexer has a transmitter port which is coupled to the output of the power combiner. The duplexer also has a receiver port coupled to the plurality of transceivers. The receiver port of the duplexer may be coupled through a receiver multicoupler to the receiver input of the plurality of transceivers. The duplexer also has an antenna port.

A power divider is provided with a first port which is coupled to the antenna port of the duplexer. The power divider has a plurality of divider ports and uses a plurality of divider striplines with each divider stripline transforming a first port impedance of the divider stripline by a ratio of 2:1 to a second port impedance of the divider stripline. The power divider divides the power of the ACSB signals among the plurality of divider ports. The plurality of divider striplines are connected with at least a first port of a first divider stripline and a first port of a second divider stripline coupled to the antenna port of the duplexer. A second port of the first divider stripline may be coupled to a first port of a third divider stripline and a first port of a fourth divider stripline, and a second port of the second divider stripline may be coupled to a first port of a fifth divider stripline and a first port of a sixth divider stripline. With the power divider having six divider striplines, the second ports of the third, fourth, fifth, and sixth divider striplines serve as the plurality of divider ports of the power divider.

A plurality of radiax cables are coupled to the plurality of divider ports of the power divider. The radiax cables radiate the ACSB signals to and receive the ACSB signals from the plurality of remote units.

A second embodiment of an extended cordless telephone system communicates digital-information signals from a plurality of communications lines to a plurality of remote units, and comprises a control processor, packet means, a plurality of transmitters, a power combiner, and at least one radiax cable. The packet means generates packet data signals from the plurality of digital-information signals and control data signal, by formatting with time division multiplex, the plurality of digital-information signals and the control data signal as one packet data signal. In a particular embodiment, a packet data signal may time division multiplex four digital-information signals and one control data signal.

The plurality of transmitters has each transmitter responsive to a control signal from the control processor for transmitting the packet data signals as communication data signals. The communication data signals may use phase shift keying, frequency shift keying, or other techniques which may be employed for transmitting data. The transmitter frequency hops, transmitting the packet data signals on a plurality of frequencies.

The power combiner is coupled to the plurality of transmitters, and includes a plurality of combines striplines, as previously set forth, which are connected for combining power of the communication data signals from the plurality of transmitters, at the output of the power combiner. At least one radiax cable is coupled to the output of the power combiner for radiating the communication data signals to the plurality of remote units.

The second embodiment of the extended cordless telephone system may additionally include a first plurality of receivers, a duplexer and a power divider coupled between the power combiner and the radiax cable. The duplexer isolates the plurality of receivers from the first plurality of transmitters. The duplexer is coupled through a receiver multicoupler to the plurality of receivers. The power divider may be embodied as previously described, and coupled to a plurality of radiax cables.

The second embodiment of the present invention may additionally include a second plurality of receivers coupled through the receiver multicoupler. The second plurality of receivers monitors the plurality of frequencies on which the plurality of transmitters frequency hop, transmitting the communication data signals. In response to detecting an interfering signal, which is interfering on at least one of the plurality of frequencies, the second plurality of receivers generates a nonavailability signal, which includes information of the frequency of the interfering signal. The nonavailability signal is sent to the control processor. In response to the nonavailability of the signal, the control processor reassigns the frequency with the interfering signal at the plurality of transmitters to a noninterfered frequency with no interference, of the plurality of frequencies. This reassignment changes the frequency with the interfering signal to the noninterfered frequency in the plan for frequency hopping for the plurality of transmitters.

Additional objects and advantages of the invention will be set forth in the description, and in part will be obvious from the description, or may be learned by practice of the invention. The objects and advantages of the invention also may be realized and attained by means of the instrumentalities and combinations pointed out in the appended claims.

BRIEF DESCRIPTION OF THE DRAWINGS

The accompanying drawings, which are incorporated and constitute a part of this specification, illustrate particular embodiments of the invention, and together with the description, serve to explain the principles of the invention.

FIG. 3A illustrates plurality of transmitter modules coupled to a power combiner employing a plurality of combiner striplines;

FIG. 3B is a block diagram of a transmitter module;

FIG. 8 is a block diagram of the extended cordless telephone service common control equipment;

FIG. 9 is a block diagram of the extended cordless telephone service handset transceiver; and FIG. 10 is an overview of point of sale terminals for the extended cordless telephone service.

DETAILED DESCRIPTION OF THE PREFERRED EMBODIMENTS

Figure 1:
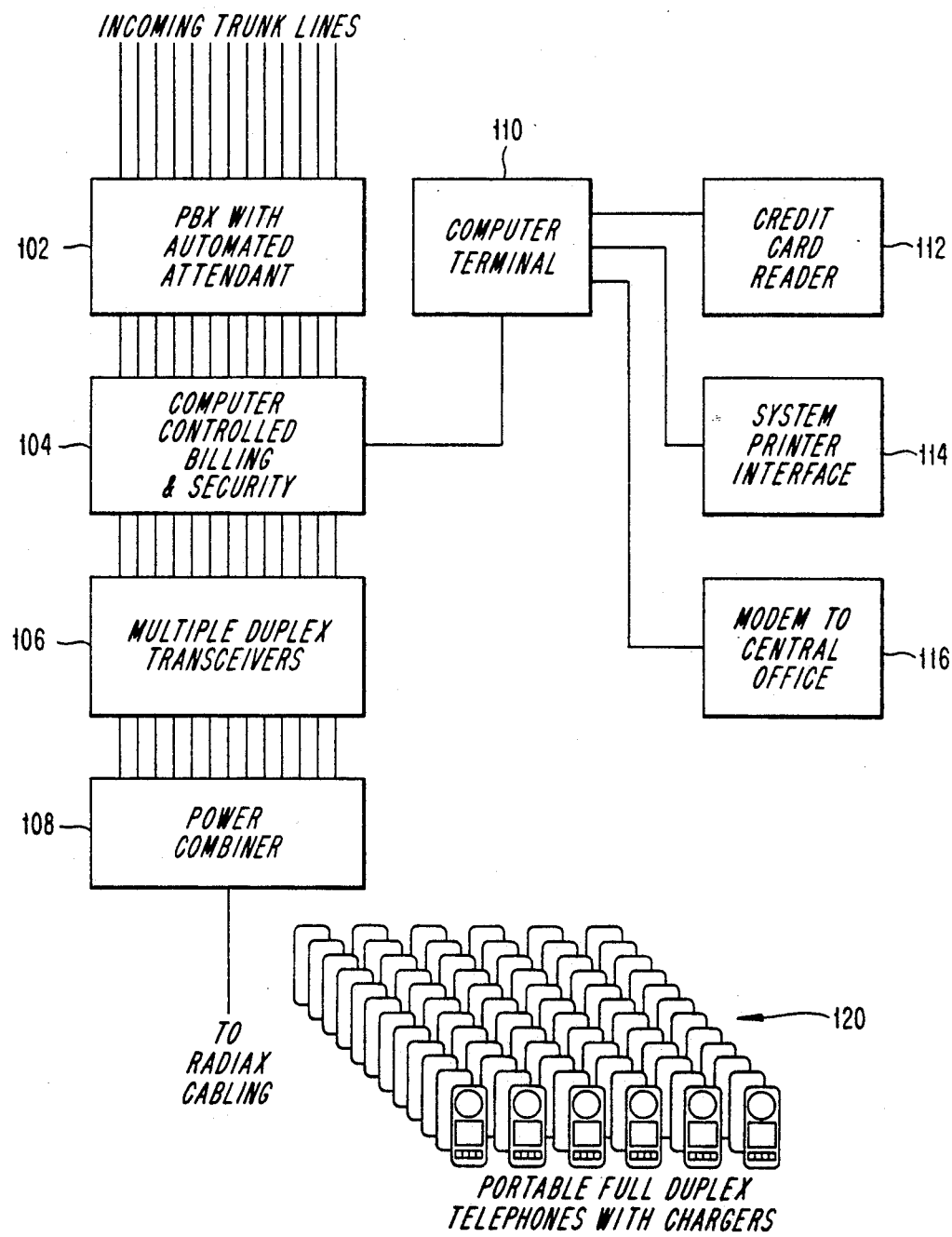
FIG. 1 illustrates an overview of the extended cordless telephone service system.

Reference will now be made in detail to the present preferred embodiments of the invention, examples of which are illustrated in the accompanying drawings, wherein like reference numerals indicate like elements throughout the several views.

Referring to FIG. 1, a system concept of the extended cordless telephone system is shown comprising private branch exchange (PBX) telephone system 102 with an automated attendant, computer controlled billing and security device 104, computer terminal 110, credit card reader 112, system printer interface 114, modem to central office 116, multiple duplex transceivers 106, power combiner 108, and a multiplicity of remote units embodied as cordless telephone handsets 120. The PBX 102 is coupled to incoming trunk lines to provide automatic direct inward dialing (DID) and direct outward dialing (DOD) operating for system users. The computer controlled billing and security device 104 is connected to the PBX 102. The computer controlled billing and security device 104 provides automated airtime billing and specialize mobile digital radio (SMDR) information for the system owner or manager.

The multiple duplex transceivers 106 are coupled through the computer controlled billing and security device 104 to the PBX 102. A transceiver is well known in the art to include a transmitter and a receiver, which terms are used throughout this specification. The computer terminal 110 is connected to the computer controlled billing and security device 104, for controlling and operator interacting with the computer controlled billing and security device 104. The multiple duplex transceivers 106 are further coupled through the power combiner 108 to at least one radiax cable which runs throughout a facility to provide RF radiation. In use, the greatest distance between the radiax cable and any single cordless telephone handset is anticipated to be not greater than 200 feet. The use of the radiax cable allows the system to limit RF radiation to within an internal area of a facility, in which the system is utilized.

In operation, the PBX with the automated attendant 102 receives information signals as DID incoming calls from the trunk lines, and appropriately prompts callers for the receiving party's personal identification number (PIN) code. The information signals include, but are not limited to, voice, data, facsimile, and other information and message formats. After the caller dials the PIN code on their touch tone telephone key pad, the system will validate each cordless telephone PIN code and direct that particular call to that cordless telephone transceiver. Outbound telephone calls, DOD, are initiated by a cordless telephone handset, which have a handshake of protocol information with the corresponding transceiver of the multiple duplex transceivers 106. The corresponding transceiver then establishes a request for an available outside line through the PBX 102. Local calls can be billed at a fixed rate. Long distance calls be billed either at actual incurred cost or SMDR computed cost, or the caller can use their preferred long distance credit card service.

The cordless telephone handsets 120 have the capability for contacting other cordless telephone handsets by dialing an access key code plus the receiving party's PIN code. This capability allows attenders at a convention or show, and exhibitors to contacted one another should the need arise.

The multiplicity of cordless telephone handsets 120 can be rented any time during a convention or trade show, to both convention exhibitors and attenders for use within the convention center facility. The system is designed so that RF attenuates within the facility. This is due to the cooperative function of loss in a power combiner and radiax cabling. Accordingly, any telephone handset which is removed from the facility will not operate.

Rentals may take place from one or more telephone rental kiosks and the telephone handsets can be rented via credit card. Rentals can be billed daily, and upon return of a rental telephone handset, a customer will be given a completely itemized SMDR receipt with all local and long distance charges itemized.

Figure 2:
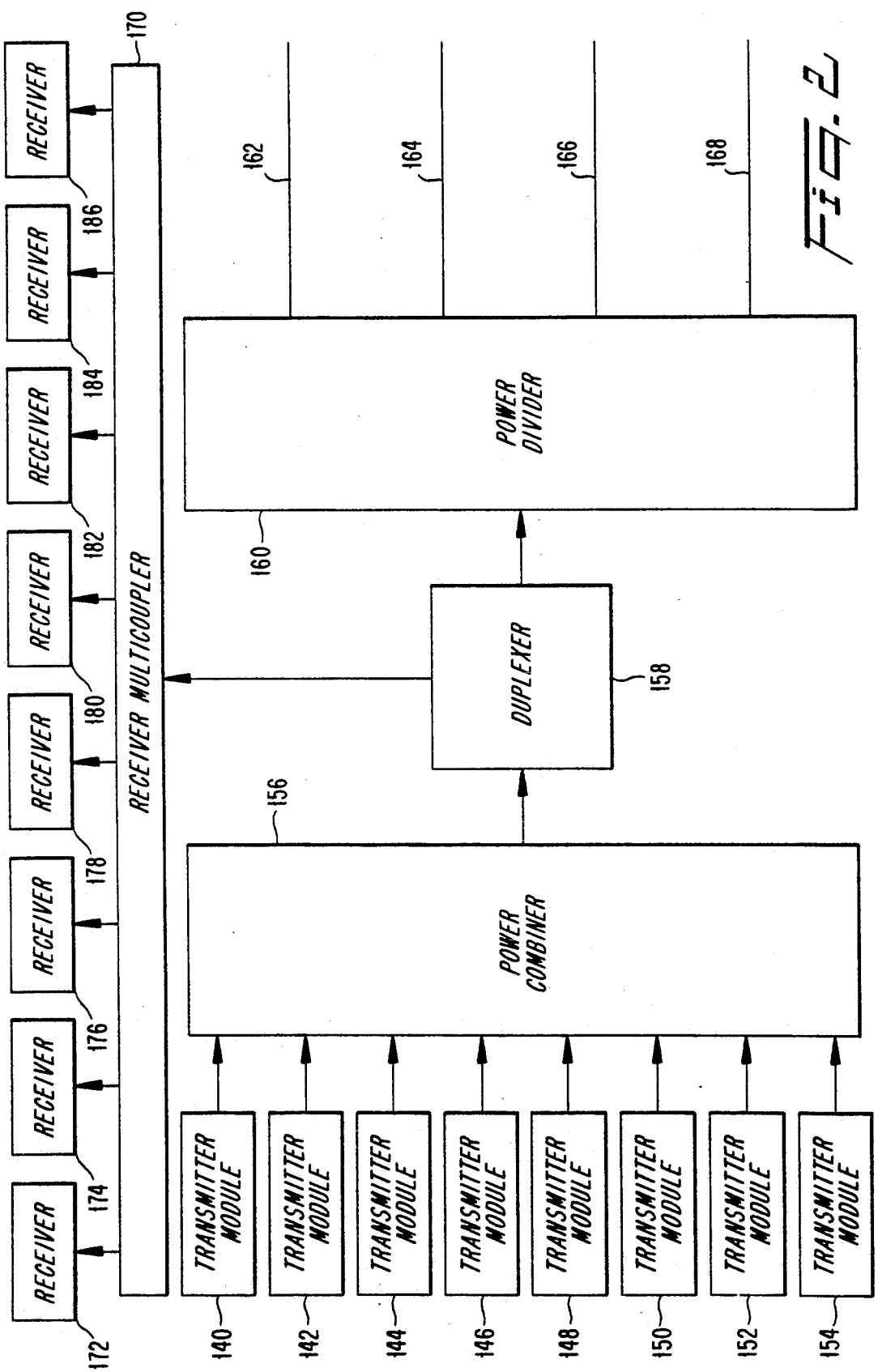
FIG. 2 is a block diagram of one embodiment of the radio section of the extended cordless telephone service.

A technical description of a first embodiment of the extended cordless telephone system is shown in FIG. 2, and includes a central station for communicating with a plurality of remote units. The remote units may be telephone handsets, computer terminals, data devices, or any other device which may be used for remote communications. The central station communicates information signals to and from the plurality of telephone trunk lines. The central station includes a plurality of transmitter modules, shown as first, second, third, fourth, fifth, sixth, seventh and eighth transmitter module 140, 142, 144, 146, 148, 150, 152, 154, a power combiner 156, a duplexer 158, a power divider 160, a plurality of radiax cables, shown as first, second, third and fourth radiax cable 162, 164, 166, 168, a receiver multicoupler 170, and a first plurality of receivers, shown as first, second, third, fourth, fifth, sixth, seventh and eighth receiver 172, 174, 176, 178, 180, 182, 184, 186. While the present invention is embodied having the plurality of transmitter modules and the first plurality of receivers shown for eight transmitter modules and eight receivers, the present invention is by no means limited to eight transmitter modules and receivers and preferably this plurality may include 512 transmitter modules and receivers. Also, the plurality of transmitter modules and the first plurality of receivers may be embodied as a plurality of transceivers, as is well known in the art.

The plurality of transmitter modules 140, 142, 144, 146, 148, 150, 152, 154 are coupled to the power combiner 156. The duplexer 158 has a transmitter port which is coupled to an output of the power combiner 156. The duplexer 158 also has a receiver port which is coupled to the receiver multicoupler 170. The duplexer 158 additionally has an antenna port which is coupled to an input port of the power divider 160. The receiver multicoupler 170 is coupled to the first plurality of receivers. The duplexer 158, which are readily available and well known in the art, allows power from the transmitter port to pass to the antenna port, power from the antenna port to pass to the receiver port, but inhibits power from the transmitter port from passing to the receiver port. By way of example, a Celwave duplexer model number 900/2 may be used.

Preferably, the plurality of transmitter modules transmit information signals from the plurality of telephone lines, using amplitude companded sideband (ACSB) signals. The power combiner 156 combines the ACSB signals outputted from the plurality of transmitter modules.

The power divider 160 has a plurality of divider ports. The first, second, third and fourth radiax cables 162, 164, 166, 168 are coupled to the plurality of divider ports of the power divider 160 for radiating the ACSB signals to and receiving the ACSB signals from, the plurality of remote units.

The power divider 160 is constructed using essentially the same technology as power combiner 156. As a power divider, the power divider 160 has a plurality of divider ports, and an input port. The power divider 160 has included therein a plurality of divider striplines with each stripline transforming a first impedance of a first port by a ratio of approximately 2:1 to a second impedance of a second port. The impedance ratios of each divider stripline might be 100 OHMS from the first port to 50 OHMS at the second port. Preferably the plurality of divider striplines are connected with at least a first port of a first divider stripline and a first port of a second divider stripline connected in parallel to the antenna port of duplexer 158. The input impedance of the first port of the first divider stripline and the second divider stripline are each 100 OHMS. Accordingly, the parallel combination of the input ports of the first and second divider striplines is 50 OHMS which matches the preferable impedance, 50 OHMS, of the antenna port of duplexer 158. Additional divider striplines can be connected to the output of the first and second divider striplines in a similar manner to increase the number of output ports of power divider 160. In a transmit mode, the power divider 160 operates to divide power from the plurality of transmitter modules among the plurality of radiax cables. In a receive mode the power divider 160 operates to combine power from the plurality of radiax cables through the duplexer to the receiver multicoupler.

Signals received via the first, second, third and fourth radiax cables 162, 164, 166, 168 are combined by power divider 160 which acts as a power combiner, pass through duplexer 158, through receiver multicoupler 170 to the first, second, third, fourth, fifth, sixth, seventh and eighth receiver 172, 174, 176, 178, 180, 182, 184, 186.

A key to the present invention is the lossy path found in the radiax cable. The loss of the radiax cable provides, after the signals come out of the power combiner 156 and divider 160, that the signals do not reflect back through power divider 160 to power combiner 156. In essence, the lossy radiax cables 162, 164, 166, 168 provide a termination load, and limit the amount of waves reflected back into the power divider 160. By way of example, Andrew RXLD-1 cable may be used as the radiax cable.

To better understand the present invention, FIG. 3A shows the details of the power combiner 156. Broadly, the power combiner 156 includes a plurality of combiner striplines with each combiner stripline transforming an input impedance by a ratio of approximately 1:2 to an output impedance. Preferably, the input impedance of each combiner stripline is 50 OHMS and the output impedance of each combiner stripline is 100 OHMS. Accordingly, each combiner stripline transforms the input impedance from 50 OHMS to an output impedance of 100 OHMS. The plurality of combiner striplines are connected for combining the ACSB signals outputted from the plurality of transmitter modules 140, 142, 144, 146, 148, 150, 152, 154 with impedance matching to an output of the power combiner 156.

More particularly, in FIG. 3A, at least an output from a first combiner stripline combiner 202 and an output from a second combiner stripline 204 are coupled to an input of a third combiner stripline 218. By connecting the output of the first combiner stripline 202 and the output of the second combiner stripline 204 in parallel, the effective output impedance of the two 100 OHM outputs is 50 OHMS, which is matched to the input impedance, 50 OHMS, of the third combiner stripline 218. This matching of impedance causes the maximum power to transfer at the node, where the outputs of the first and second combiner striplines 202, 204 are connected to the input of the third combiner stripline 218.

The combiner striplines accordingly, match impedances and combine the power or energy output from the first and second transmitter modules 140, 142, at the output of the first and second combiner striplines 202, 204, which are connected in parallel. Furthermore, the outputs of third and fourth transmitter modules 144, 146, may be coupled to inputs of a fourth combiner stripline 206 and a fifth combiner stripline 208, respectively. The outputs of the fourth and fifth combiner striplines 206, 208 are coupled to an input of a sixth combiner stripline 220. Further, the outputs of a fifth and a sixth transmitter modules 148, 150 are coupled to inputs of seventh combiner stripline 210 and eighth combiner stripline 212. The outputs of seventh and eighth combiner striplines 210, 212 are coupled to an input of a ninth combiner stripline to 222. Also, the outputs of seventh and eighth transmitter modules 152, 154 are coupled to the inputs of tenth and eleventh combiner striplines 214, 216. The outputs of tenth and eleventh combiner striplines 214, 216 are coupled to an input of twelfth combiner stripline 224.

As shown in FIG. 3A, outputs of the third combiner stripline 218 and the sixth combiner stripline 220 are coupled together and to an output of a thirteenth combiner stripline 226. Also, outputs of ninth combiner stripline 222 and twelfth combiner stripline 224 are coupled to an input of fourteenth combiner stripline 228. The output of the thirteenth combiner stripline 226 and the output of the fourteenth combiner stripline 228 are coupled together to provide an output of the power combiner 156.

While the concept for the power combiner 156 has been shown for an input of eight transmitter modules, the concept may readily be extended to any number of transmitter modules.

In the preferred frequency band, 900 MHz, the combiner striplines of the present invention are lossy. The commercially available striplines which are used for building embodiments of the power combiner may have losses of 1.2-1.4 dB. Thus, at the final node output of the power combiner 156 there can be substantial isolation due to the losses of the combiner striplines. In a preferred embodiment, it is desired to have the plurality of transmitter modules radiate approximately 5-10 watts output, into the power combiner 156. When the power combiner 156 has sufficient stripline combiners for handling 512 transmitters, the losses are anticipated to be such that the output from each transmitter module will be approximately 100-200 milliwatts, at the output of the power combiner 156.

The power combiner 156 of the present invention provides a significant advantage over the prior art. Prior art power combiners normally may combine 40 or less channels. The limitation of prior art power combiners are due to multiple order intermodulation product problems, due to nonlinearities in the transmitters, and poor isolation of the intermodulation products in the power combiner. Usually the transmitters in the prior art employ FM modulation with class C amplifiers. Also, prior art power combiners typically have low loss between two transmitters through the combiner, which increases the intermodulation product problem. The power combiner 156 allows connecting in excess of 40 transmitters, and the losses in the plurality of combiner striplines help reduce the intermodulation product problem.

The frequency plan of the present invention employs maximum spacing of frequencies between transmitters feeding adjacent nodes of a combiner and between internal combination nodes. This frequency plan is a key to proper combiner operation. For example, the first and second transmitter modules 140, 142 shown in FIG. 3A, would operate on transmitter frequencies as widely separated as possible. Also, third and fourth transmitter modules 144, 146 also will operate on transmitter frequencies as widely separated as possible. Similarly, fifth and sixth transmitter modules 148 and 150 will operate on transmitter frequencies as widely separated as possible. As the outputs of each of the transmitter modules are combined to the various nodes of the network of the combiner striplines in power combiner 156, carrier signals with frequencies closer to each other would merge until the entire transmitter band would be filled at the output of the combiner 156. As transmitter frequencies with closer frequency spacing are combined together near the output of the power combiner 156, the power of each of the carriers on these frequencies decreases due to loss in the combiner striplines. Thus, carrier frequencies which are closer to each other combine in the power combiner at a reduced power level, due to the loss in the combiner striplines.

As previously mentioned, the loss in the radiax cable provides essentially a termination load, thereby reducing the amount of signals reflected back either through power divider 160 or directly to power combiner 156. The radiax cable loss reduces the intermodulation product problem due to reflected radio waves from the radiax cable. The combination of the loss in the power combiner 156 and radiax cable operate cooperatively to reduce intermodulation products, thereby allowing a large number of transmitter modules to be combined through power combiner 156.

A representative transmitter module of the eight transmitter modules shown in FIG. 3A, is further depicted in FIG. 3B. A transmitter module 230 is shown having an ACSB transmitter 232, linear amplifier 234, high Q filter 236, and isolator 238. The ACSB transmitter 232 provides a very clean signal, and preferably would have approximately 5 kHz bandwidth. ACSB modulation is used because it is essentially a clean signal. The linear amplifier 234 may be a class A or Class AB type amplifier. The high Q filter 236 can be embodied as a helical resonator filter, and the isolator 238 can be embodied as a ferrite isolator. The ACSB transmitter 232 is coupled to the linear amplifier 234. The linear amplifier is coupled through the high Q filter 236 to the isolator 238. The isolator 238 provides protection circuitry so that power from each transmitter module 230 does not go to other tramsmitter modules.

The present invention has the advantage that the isolator 238 keeps the power going in one direction, out of the transmitter 232 and into the power combiner 156. The isolater reduces the problem of intermodulation products by preventing power from the other transmitters from mixing with each other in their output stages.

The extended cordless telephone system of the present invention would preferably operate in the 900 to 928 MHz band. Two segments of this band are needed at the band extremes. These segments are two to three megahertz in width and used for full duplex system operation. Transmitted signals from a handset to the central station may be in the high segment or 925 to 928 MHz range. Transmitted signals from the central station to a handset can be in the lower segment, or 900 to 905 MHz range. This allows 20 MHz separation between the receive and transmit frequencies. The large separation in frequency allows excellent system voice and data quality and inexpensive methods to be employed in the duplexer 158 and power combiner 156. Other bands and separations may be used, however, but at greater expense and possible degradation in voice and/or data transmission quality.

As mentioned, to allow efficient usage of the allocated spectrum, amplitude companded sideband (ACSB) modulation is employed. Channel spacing can be 5 kHz apart and individually keyed inversion voice scrambling may be employed in both transmission paths.

To allow for combining, duplexing, and power splitting losses, each of the transmitter modules of the transceivers is adjusted to radiate from one to five watts of RF power output. It is anticipated that up to 10 dB of combining loss will occur in the power combiner in a large system. The one to five watt power output range will allow 100 to 400 milliwatts to be delivered at the output of the power combiner, to the input of power divider and the radiax coaxial antenna system. This radiation method anticipates the use in combining of up to 512 transmitters to one antenna system.

In a preferred embodiment, the power combining may be done in two stages. A first stage may combine a first and second set of 16 transceivers, or transmitter modules and receivers of the transceivers, located in a card rack. A second stage will combine the outputs of the first and second sets together. Once combined the output of the power combiner are duplexed with the receive frequency band into a 50 OHM input/output port. In small systems the radiax cable antenna system is directly connected to this port. In large systems the combined input/output is split by a power divider and then output through multiple low loss transmission lines to radiax cables.

A standard PBX would be used, by the present invention, having remote programming of user line assignment and options, user usage accounting, operator access through a trunk circuit and DID capability. System options include voice mail and call forwarding. Standard two-wire station line circuits can be utilized for the transceiver interface. Communications with user accounting and management software can be through an RS-232 port.

The control processor may be an IBM 80286 or 80386 or similar computer based system. This system can run multitasking software to manage data processing for the central station. The computer includes the task of data base management for user assignment, accounting, credit card validation, point of sale (POS) pricing, and reservations; remote modem access switching to any system function; POS terminal host; transceiver programming and ID code assignment; system alarms and failure recovery; and batch communications of accounting and assignment data to a head office.

Point of sale terminals may include an 8088 or 80286 based IBM systems, credit card reader, receipt printer, and handset test/programming station. A rental requires the operator to enter the user information via keyboard or credit card reader, read the handset bar coded serial number and first order ID code label, insert the handset into the test/programming station, once in the station the computer will assign the handset operating RF channel electrical ID number, verify operation of all functions on air testing, and test battery capacity.

Figure 4:
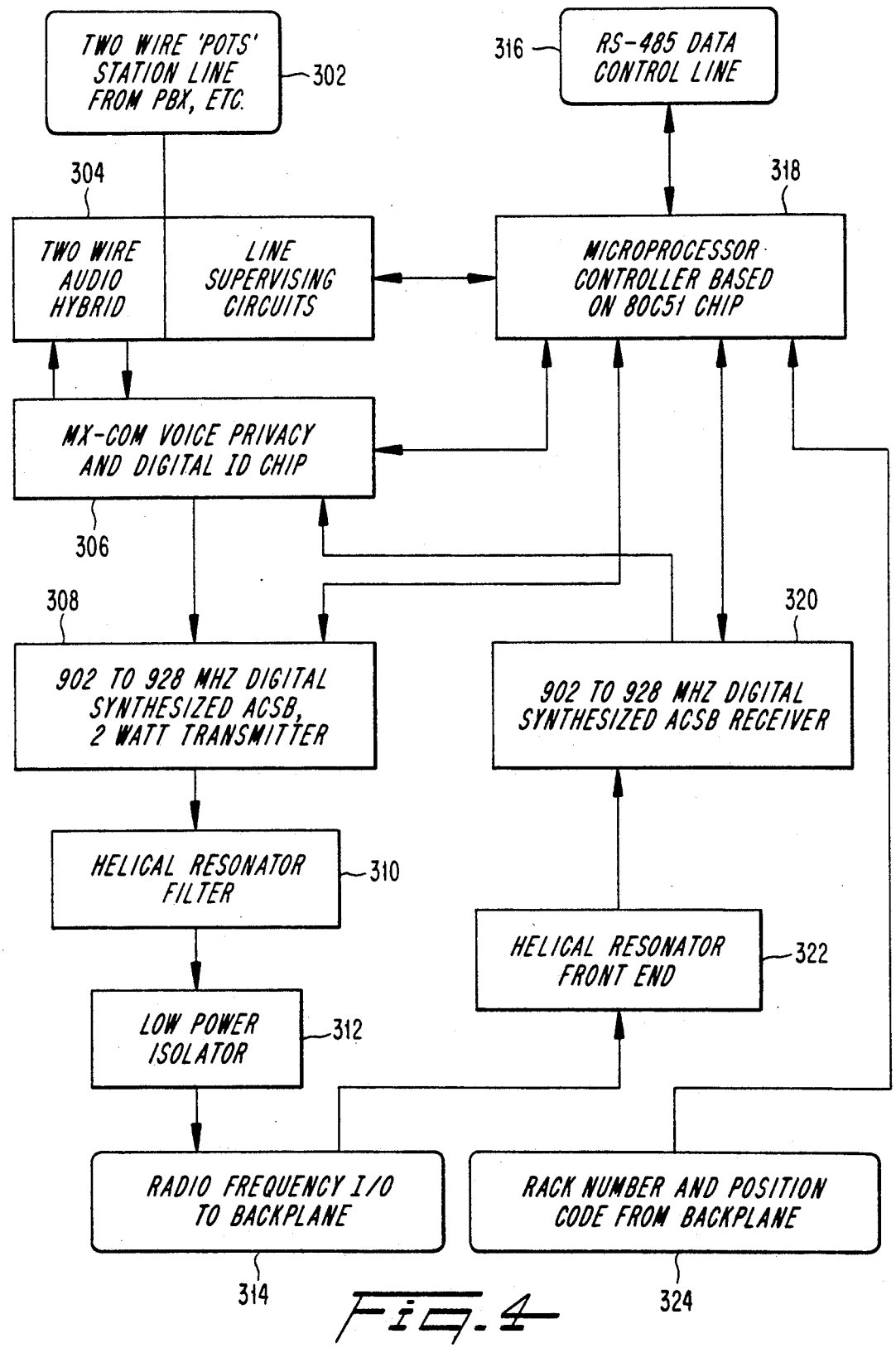
FIG. 4 is a block diagram of the extended cordless telephone service, transceiver.

The transceivers may be mounted on printed circuit modules, which plug into standard equipment racks. As illustratively shown in FIG. 4, the transceivers may include two wire audio circuitry 304 coupled to two wire station lines from a PBX 302 which also includes lines supervising circuits as shown. A synthesized 902 MHz to 928 MHz transceiver circuitry which includes a transmitter 308 and a receiver 320, and a microprocessor controller 318 are on each board. Data control line 316 is connected to microprocessor 318, and a rack number and position code from the back plane 324 are connected to microprocessors 318. A microprocessor is connected to and controls receiver 320, transmitter 308, voice privacy and digital ID chip 306, and line supervising circuits 304. A helical resonator filter 310 is coupled to the transmitter 308, and a lower power isolator 312 is coupled to the output of the helical resonator filter 310. Similarly, a helical resonator front end 322 is coupled to the receiver 320, and the output of the low power isolator 312 and helical resonator front end 322 is coupled to the radio frequency I/O 314.

The transceiver, including the transmitter 308 and receiver 320, are digitally synthesized and the operating channel is loaded into the synthesizer by the microprocessor controller 318. A transceiver synthesizer is able to use both on board personal computer input output (PCXO) or external source for its frequency reference. In one embodiment, an operating channel can be determined by a 10-bit code which includes a card position in a rack and rack position in the system.

The audio circuit includes three sections. The first section provides hybrid action for balance termination for the PBX extension line and separation of the transmit and receive audio signals. The second section is the MX-COM voice privacy IC and digital ID code generator. The third section is the REPCO module audio processing and companding circuitry.

The control processor 318 includes a 80C51 single chip microprocessor and a serial EEPROM. Data communications to the overall control processor 318 is over the RS-485 multidrop LAN. Data received via this LAN include the channel, ID, transceiver operation verification tests and operations. The EEPROM stores the RF channel ID code, and options programmed for the user. The microprocessor is responsible for total operation of the transceiver including FCC modulated time out timer and proper channel assignment.

The transceiver card racks hold up to 16 transceivers. In this particular embodiment, each card rack can have a combiner with 16 inputs, and a receiver multicoupler with 16 outputs.

A second stage of the power combiner can include a power combiner with 32 inputs. Each input as well as the output is 50 OHMS impedance. As mentioned previously, combiner striplines are employed to match each pair of inputs to a node. Five nodes for a 32 input system is used to combine the 32 inputs into one output.

The frequency plan, as mentioned previously, selected for this system is the key to the combiner operation. The plan allows the nodes closest to the transceiver to combine the channels with the greatest separation. As the nodes progress from the transceivers to the output the channel separation decreases but the loss and amount of energy reflected back to the transceivers and their isolators limit the production of intermodulation products to FCC acceptable limits.

In a preferred embodiment, the antenna system uses radiax radiating transmission line. The radiax is placed to provide coverage over a service area in a convention center. Normally, if runs of greater than 500 feet of radiax are used, then a power divider is installed and the radiax is divided into four sections and fed through the transmission line.

Figure 5:
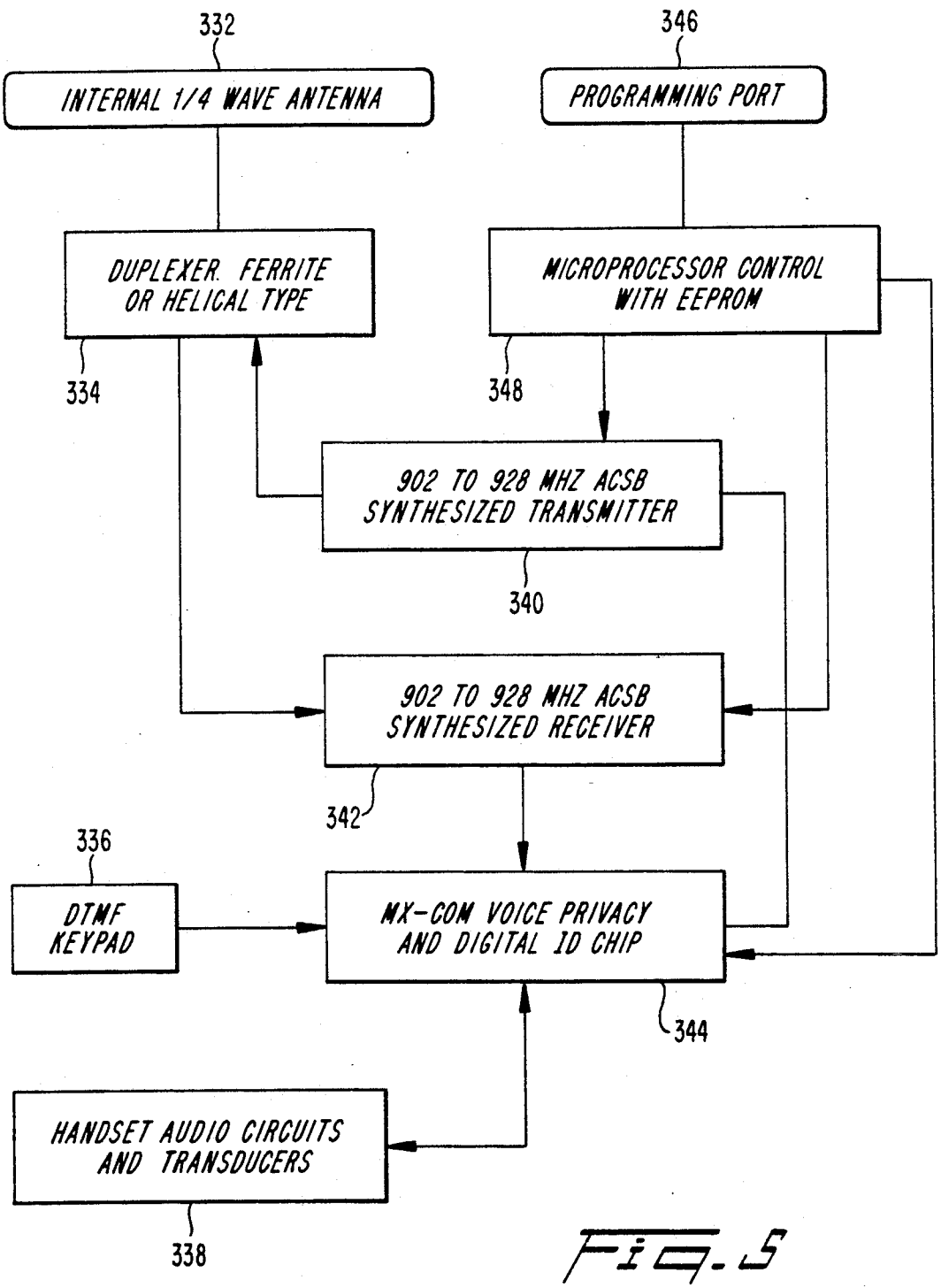
FIG. 5 is a block diagram of the extended cordless telephone service radio station equipment.

The hand set units, as shown in FIG. 5, include a frequency synthesized ACSB transmitter 340, voice privacy and digital ID chip 344, audio circuit and transducers 338, and control microprocessor 348. The handset uses an internal antenna 332. The amplitude companded sideband (ACSB) transmitter 340 synthesized receiver 342 and transceiver 340 are coupled through a duplexer 334, to the internal antenna 332. The control microprocessor 348 is coupled to and controls the synthesized transmitter 340, synthesized receiver 342, and the voice privacy and digital ID chip 344. A programming port 346 is available for reprogramming the EEPROM of microprocessor 348.

The control microprocessor 348 has an EEPROM which stores set up parameters. The EEPROM is programmed by the test/programming station at each POS terminal. Parameters stored in the microprocessor memory EEPROM are the operating RF channel, ID code, operating life, and dispatch option. Operating life will allow the ability to limit the useful lifetime of the handset. Once this allocated time in hours or days is used up the handset goes dead until reprogrammed. This is useful to deter theft as the unit will not turn on, and instead will become useless after this time expires. Cloning of handsets to allow partyline operation, intercomming and dispatch, i.e., repeater operation are possible. The handset and audio circuits 338 are coupled to the voice privacy and digital ID chip 344. Also included on a handset will be a DTMF keypad 336, for inputting telephone numbers. The DTMF keypad 336 is coupled to the voice privacy and digital ID chip 344. The voice privacy and digital ID chip 314 is coupled to the ACSB synthesized receiver 342 and the ACSB synthesized transmitter 340.

Figure 6:
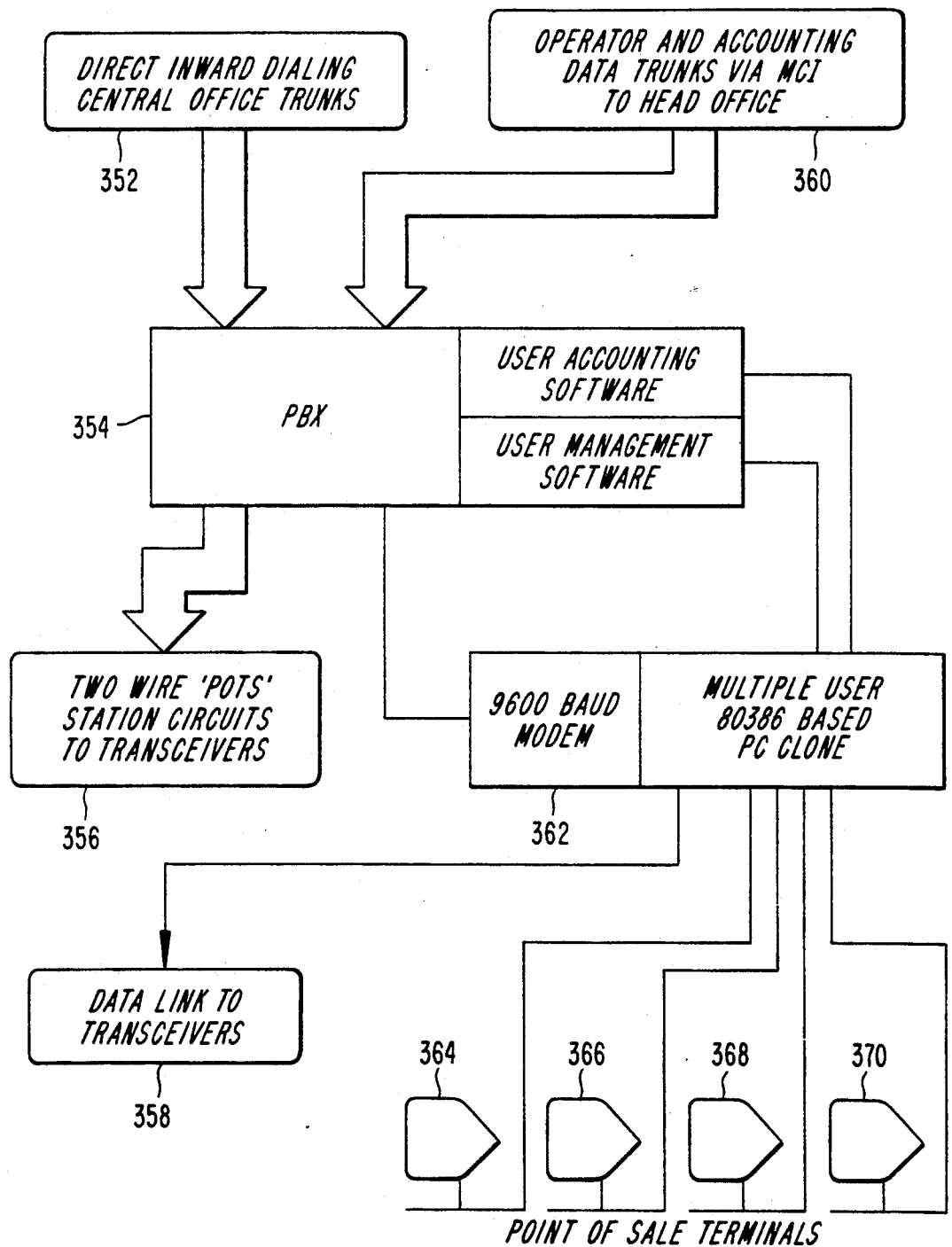
FIG. 6 is a block diagram of the extended cordless telephone service common equipment.

The common equipment of the central station is illustratively shown in FIG. 6. The common equipment includes multiple racks of transceivers which are coupled through a data link 358. The multiple racks of transceivers additionally include two stages of RF combining, two stages of receiver antenna coupling, duplexer, optional power divider, and one or more radiax antenna systems.

As shown in FIG. 6, a private branch exchange 354 is coupled to direct inward dialing central telephone office trunklines 352. Operator and accounting data trunklines are coupled from a head officer 360 to PBX 354. User account information and management 362, and a modem may also connect to the PBX 354. A processor 362, and a modem may also connect to the PBX 354. A plurality of POS terminals 364, 366, 368, 370, within a convention center, which may employ IBM 8088 type equipment and software, are coupled to the processor 362. Each POS terminal may include a credit card reader, ticket printer, bar code wand, and optional cash drawer.

Figure 7:
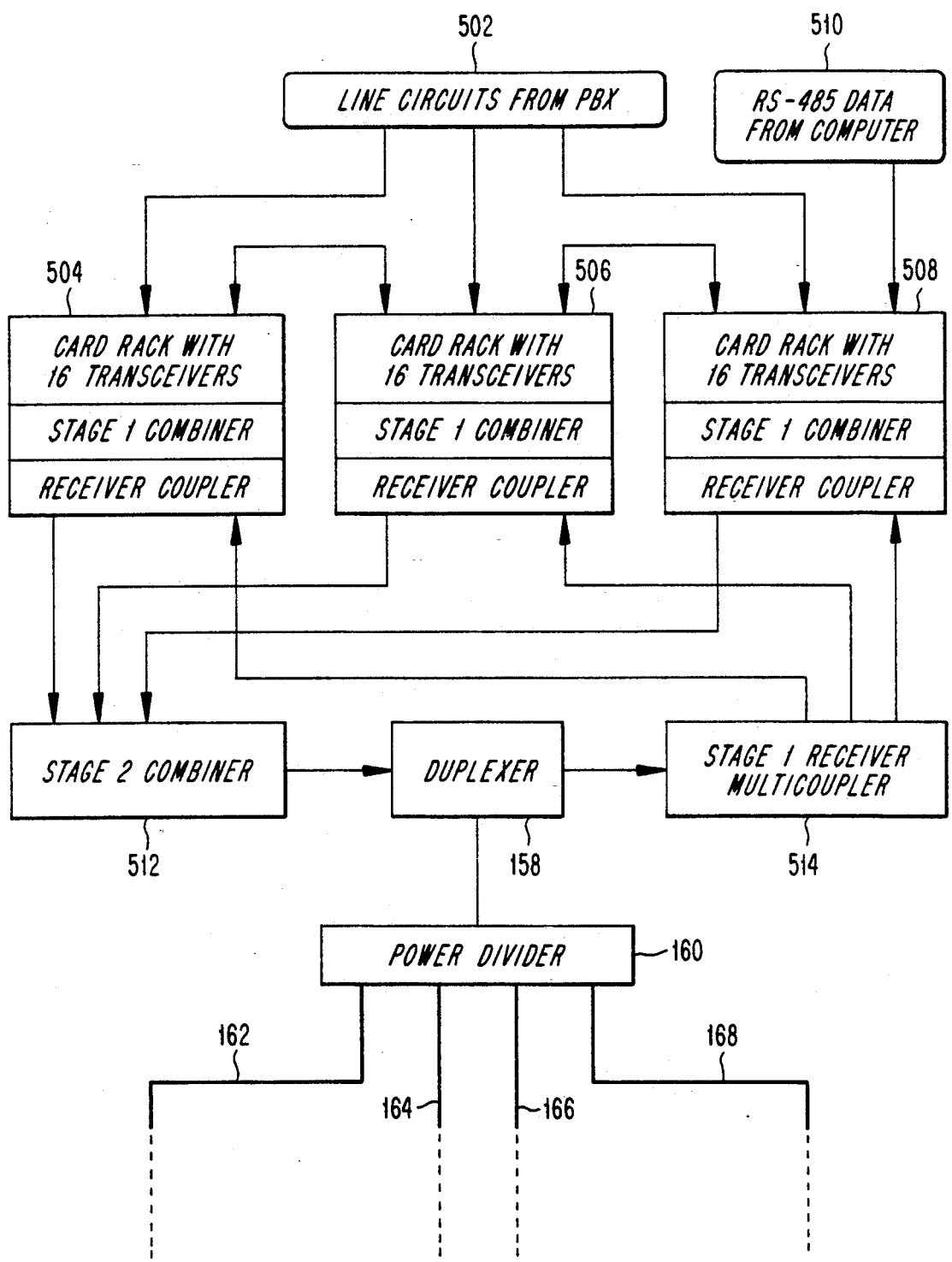
FIG. 7 is a block diagram of the extended cordless telephone service transceivers.

As shown in FIG. 7, a central station is shown with a line circuit from a PBX 502 coupled into a first, a second, and a third set of card racks 504, 506, 508 with each card rack having 16 transceivers, a combiner combining the outputs of the 16 transceivers, and a receiver coupler coupling first, second, and third to the 16 receivers on each card. The output of the combiner is coupled to a stage two combiner 512 from the card racks 504, 506, 508. The output of the second stage combiner 512 is coupled to a duplexer 158 and to a first stage receiver multicoupler 514. The first stage receiver multicoupler 514 is coupled to the second stage receiver multicoupler in the card rack 504, 506, 508. Additionally, a power divider 160 is coupled to the output of the duplexer 158 with a plurality of radiax cables 162, 164, 166, 168, coupled to the power divider 160.

FIG. 8 illustrates the common control equipment for switching the signal through the duplexer/combiner arrangement into a single radiating coaxial line system. A PBX and auto attended 552 are coupled to external telephone lines. A control processor 556 is coupled to the PBX 552 and to a matrix switch 554. The control processor 556 is coupled to a control channel 550 and the plurality of transceiver units 540, 542, 544, 548. The plurality of transceiver units are coupled through the combiner and receiver distribution 551 to the duplexer 158 and power divider 160.

FIG. 9 illustrates an alternative embodiment of the handset transceiver as having a ACSB transmitter 584, ACSB receiver 774, which are coupled through a duplexer 572 to a antenna 570. A synthesizer TCXO controller 582 is coupled to and controls the frequencies for the transmitter 584 and receiver 774. An audio processor 576 receives audio signals from receiver 774 for listening on an earphone, and sends audio signals from a microphone to the transmitter 584 for transmission. A microprocessor 578 is coupled to the audioprocessor 576, receiver 774, transmitter 584, synthesizer 582. A keyboard 580 is available for controlling microprocessor 578.

FIG. 10 illustrates POS terminals employing a local service processor 604 having a local display 602, keyboard 606, and card reader 608. The local servicing processor also is coupled to programming and test stand for the handsets 610.

The present invention may include a second plurality of receivers which is coupled through a second receiver multicoupler to the duplexer. The second plurality of receivers monitor the plurality of frequencies on which the plurality of ACSB transmitter modules transmits and the first plurality of receivers receives the communications signals. In the event an interfering signal is detected on one of the plurality of frequencies, then the receiver of the second plurality of receivers which detects the interfering signal, generates a nonavailability signal. The control processor reassigns the frequency with the interfering signal at the corresponding transmitter module and at the remote units, to a frequency with no interference, of the plurality of frequencies. The control processor does this in response to receiving the nonavailability signal from the receiver of the second plurality of receivers detecting the interfering signal. The control processor reassigns the frequency at the remote unit by sending information on the reassigned frequency through a control signal.

Spread Spectrum Cordless Telephone System

An extended cordless telephone service system for communicating digital-information signals from a plurality of communication lines to a plurality of remote units is provided, comprising a control processor, packet means, a plurality of transmitter means, a power combiner, and at least one radiax cable. Additional equipment, to be described later, may be used for the receiver aspect of this invention. The digital-information signals may be digitized versions of the previously described information signals, or may be digital signals from communications lines. The packet means may be embodied as a packet device, for generating packet data signals from a plurality of digital-information signals and a control data signal by formatting with time divisions multiplex, the plurality of digital-information signals and the control-data signal as one packet. The packet data signal may have, for example, time division multiplexed four digital-information signals for one millisecond each, and the control data signal for one millisecond. Thus, four data-information signals from four communication lines are time division multiplexed with a control data signal.

The plurality of transmitter means may be embodied as a plurality of data transmitter modules. The data transmitter modules may be embodied similar to the transmitter modules of FIG. 3B, but with a data-transmitter in place of the ACSB transmitter 232. The linear amplifier 234, high Q filter 236, and isolator 238 may be included in the data transmitter module and performing the functions as previously described.

In response to a control signal from the control processor, each data transmitter transmits the packet data signals as communication data signals. Each data transmitter transmits by frequency hopping on a plurality of frequencies. A packet data signal is transmitted on each frequency. The communication data signals may use any well known type of modulation for data signals, including phase shift keying, frequency shift keying, and other combinations and modulation types thereof.

A power combiner, similar to that previously described, is coupled to the plurality of data transmitters for combining power outputted from the plurality of data transmitters. At least one radiax cable is coupled to the output of the power combiner for radiating the communication-data signals to the plurality of remote units. The remote units may be telephone handsets, computer terminals, data devices, or other equipment for communicating digital-information signals.

The extended cordless telephone systems may further include a first plurality of receivers, a duplexer, a receiver multicoupler and a second plurality of receivers. The first plurality of receivers receives the remote-data signals transmitted from remote units for communications over the plurality of communication lines. The duplexer has a transmitter port coupled to the output of the power combiner and a receiver port coupled through a receiver multicoupler to the first plurality of receivers. An antenna port of the duplexer is coupled to the radiax cable. Alternatively, a power divider, as previously described, may be coupled to the antenna port of the duplexer. The power divider would have a plurality of divider ports with a plurality of radiax cable connected thereto.

A second plurality of receivers is also included, and is coupled through a receiver multicoupler to the duplexer. The second plurality of receivers monitors the plurality of frequencies on which the plurality of data transmitters hops and transmits and the plurality of remote units hops and receives the data-communication signals. In the event an interfering signal is detected on at least one of the plurality of frequencies, then the receiver of the second plurality of receivers which detects the interfering signal, generates a nonavailability signal. The control processor reassigns the frequency with the interfering signal at the plurality of transmitters and at the remote units, to a frequency with no interference, of the plurality of frequencies. The control processor does this assignment in response to receiving a nonavailability signal from the receiver of the second plurality of receivers detecting the interfering signal. The control processor reassigns the frequency hopping frequency at the remote units by sending information on the reassigned frequency through the control data signal.

The present invention may additionally include CRC means and error detection means. The CRC means may be embodied as a cyclic-redundancy-check (CRC) device and the error detection means may be embodied as an error detection device. The CRC device is coupled to the packet device. The CRC device generates a cyclic-redundancy-check data for each packet data signal, and multiplexes the CRC data to each of the packet data signals prior to transmitting. The error detection device, located at a receiver, checks the CRC data of each of the received packet data signals, for detecting errors and generating an error signal in response to detecting an error. A transmit signal is sent from the receiver to the transmitter, to retransmit the packet data signal having an error.

In this particular embodiment of the invention, the spread spectrum transmission, employing frequency hopping, and digital multiplexing of data is used to allow up to 160 simultaneous transmission paths of communication signals. The spread spectrum technology frequency hops channels. In one particular embodiment, the frequency hopping may occur 75 times per second and reuse channels in not less than 40 hops. Accordingly, transmitter outputs may be approximately 1 watt into the combiner at the common equipment and 100 milliwatts from the handsets.

Preferably, the modulation method is frequency shift keying (FSK) at a baud rate of 160 kilobaud, or as needed. This baud rate requires a modulated frequency of 80 kHz allowing 130 duplex 100 kHz channels. The channel bandwidth is reduced and the number of usable channels are increased by processing the analog signal prior to encoding. Amplitude companding or separating the analog signal into its base frequency, and modulating components and encoding only the changes in these components, reduce the required transmission bit rates and signal bandwidth.

The analog signals can be encoded using delta modulation rather than conventional coded analog-to-digital conversion. The delta modulation allows a channel bit rate of 34,500 baud instead of the 64,000 baud minimum required by encoding. The output and input to the delta modulators can use a first-in-first-out (FIFO) buffer to adjust the 34,500 delta modulation bit rates from/to the RF channel bit rate. Each of the 75 hops are divided into one intelligence conveying time slots and one time controlled slot.

Control data at the end of each hop slot would convey the next channel to which to hop. Redundant channel plan data contained in the wireless telephone handsets RAM would allow the handset to continue following its channel hopping plan if the control data is momentarily missed. This is done without having to be synchronized in frequency with the central station transceiver. The handset frequency plan is updated on a continuous basis by the control data packets. The redundant information minimizes dropouts due to momentary signal loss.

Each of the base transceiver cards has its communications transceiver and a monitor receiver. The monitor receivers, which are the second plurality of receivers, are to verify that the next hop channel is free. If the monitor receiver detects a conflict with other services for use of the channel, then the control processor will adjust the channel plan and update the handsets stored channel plan with current control packet being sent out. Using this technique, the system steps around co-channel use and interference.

In addition to the intelligence carrying transceivers, there are two redundant control transceivers. The control transceivers pull the "on hook" handsets for outgoing service requests and "wake up" the "sleeping" handset transceiver to receive an incoming call.

Diversity transceiving is possible under this system in large installations where radiating coaxial cable loss becomes greater than acceptable or extension of cables from one handset or transceivers is not practicable or becomes too expensive. Multiple transceiver sites can be used, with each site connected by data cables to the common site and control equipment.

One common frequency standard may be employed to supply all the transceiver sites. Each site transmitter output frequency and FSK modulation is phase locked loop to multiples of the standard. Data transmission to each site is through equalizer delays to synchronize the transmitted data phase at each site for near perfect simulcast conditions.

Each site transceivers verifies its accuracy of reception from the handset. The validity of CRC appended to each time slot transmission and an indication of receiver field strength from the receiver is used to "vote" the site with the best reception. Each packet of received data is stored during the voting process and the valid packet used by the system as the received handset data.

The diversity option of the present invention allows the system to provide noise free, drop free transceiving during the micro-phase common to the 900 MHz transmission even during site transition where it is conceivable where each site may hear the handset fifty percent of the time and phase between the site occur in the 0.05 second range.

The system includes the PBX switch with incoming trunk circuits, station line circuit, auto attended option, remote operator control option, long distance carrier, interface option, voice mail option, remote programming option, modem, 900 to 928 MHz FSK modulated frequency synthesized transceivers with a second monitor receiver. Each transceiver has intelligence enough to perform the frequency agile and audio multiplex and demultiplex functions. Each transceiver includes a three card set, with the first card being an actual RF transceiver and a second monitor receiver, with the second card being the 600 telephone company loop digitizer and multiplexer, and a third card being the local intelligence. The transceivers read their rack position and rack number from 10 positions on a back plane. The control processor provides communications between the PBX and the transceiver racks and programs each transceivers transmits/receive frequency to coordinate with a handset. In addition, the control processor updates accounting data based on requests from the point of sales terminal and batch and communicate accounting data to the central facility.

The present invention has significant advantages employing the digital embodiment. This particular embodiment includes lower costs per installation, secure communications, automatic interface connection, simpler to install and maintain, more reliable operation, diversity transceiver operation, 9600 baud customer data paths available, and lower power consumption with minimum heat dissipation.

It will be apparent to those skilled in the art that various modifications can be made to the extended cordless telephone system of the instant invention without departing from the scope or spirit of the invention, and it is intended that the present invention cover modifications and variations of the extended cordless telephone system provided that they come within the scope of the appended claims and their equivalents.

We claim:

1. An extended phone service system for communicating information signals from a plurality of telephone lines through a telephone exchange to a plurality of remote units, comprising:

central station communicating signals to and from the plurality of telephone lines, said central station including, a plurality of transceivers for transmitting and receiving the information signals as amplitude companded sideband (ACSB) signals;

a power combiner coupled to said plurality of transceivers, said power combiner including a plurality of combiner striplines with each combiner stripline transforming an input impedance by a ratio of 1:2 to an output impedance, said plurality of combiner striplines connected for combining the ACSB signals outputted from said plurality of transceivers with impedance matching to an output of said power combiner, by having at least an output of a first combiner stripline and an output of a second combiner stripline coupled to an input of a third combiner stripline, a duplexer, with a transmitter port coupled to the output of said power combiner, with a receiver port coupled to said plurality of transceivers, and with an antenna port;

a power divider with a first port coupled to the antenna port of said duplexer, and a plurality of divided ports, said power divider including a plurality of divider striplines with each stripline transforming a first port impedance by a ratio of 2:1 to a second port impedance, said plurality of divider stripline connected with at least a first divider stripline with a first port coupled to the antenna port of said duplexer and a second port coupled to a first port of a second divider stripline and a first port of a third divider stripline;

a plurality of isolators coupled between each of said transceivers and each of said combiner striplines coupled to each of said transceivers, respectively, for isolating power outputted from said transceivers;

a plurality of linear amplifiers coupled between each of said transceivers and each of said isolators coupled to each of said transceivers, respectively, for amplifying power outputted from said transceivers; and a plurality of radiax cables coupled to said plurality of divided ports for radiating the ACSB signals to and receiving the ACSB signals from said plurality of remote units.

2. The extended phone service system as set forth in claim 1, further comprising:
a plurality of high Q filters is coupled between each of said transceivers and each of said isolators coupled to each of said transceivers, respectively, for filtering power outputted from said transceivers.

3. The extended phone service as set forth in claim 2 wherein said high Q filter is a helical resonator, and said isolator is a ferrite isolator.

4. An extended phone service system for communicating information signals from a plurality of communication lines through a local exchange to a plurality of remote units, comprising:
a plurality of transmitter means having an amplitude companded sideband (ACSB) modulator coupled to said local exchange, for transmitting information signals as ACSB signals;
a power combiner coupled to said plurality of transmitter means, said power combiner including a plurality of combiner striplines connected for combining power outputted from said plurality of transmitters to an output of said power combiner;
isolator means coupled between each of said transmitter means and each of said combiner striplines coupled to each of said transmitter means, respectively, for isolating power outputted from said transmitter means;

a plurality of high Q filters coupled between each of said transmitter means and each of said isolator means coupled to each of said transmitter means, respectively, for filtering power outputted from said transmitter means; and
at least one radiax cable coupled to the output of said power means for radiating the ACSB signals to said plurality of remote units.

5. The extended phone service as set forth in claim 4 wherein said high Q filter is a helical resonator, and said isolator means is a ferrite isolator.

6. The extended phone service system as set forth in claim 4, wherein said power combiner includes a plurality of combiner striplines with each combiner stripline transforming an input impedance by a ratio of 1:2 to an output impedance, said plurality of combiner striplines connected for combining power outputted from said plurality of transmitter means with impedance matching to an output of said power combiner, by having at least an output of a first combiner stripline and an output of a second combiner stripline coupled to an input of a third combiner stripline.

7. The extended phone service system as set forth in claim 4, further comprising:
divider means with a first port coupled to the output port of said power combiner, and a plurality of divider ports, said divider means including a plurality of divider striplines with each stripline transforming a first port impedance by a ratio of 2:1 to a second port impedance, said plurality of divider striplines connected with at least a first divider stripline with a first port coupled to the output port of said power means and a second port coupled to a first port of a second divider stripline and a first port of a third divider stripline; and
a plurality of radiax cables coupled to said plurality of divider ports for radiating signals to said plurality of remote units.

8. The extended phone service system as set forth in claim 4, further comprising:
a plurality of linear amplifiers with each of said plurality of linear amplifiers coupled between each of said transmitter means and each of said isolator means coupled to each of said transmitter means, respectively, for amplifying power outputted from said transmitter means.

9. The extended phone service system as set forth in claim 4, further comprising:
a plurality of receiver means for receiving the ACSB signals; and
a duplexer, with a transmitter port coupled to the output of said power combiner, with a receiver port coupled to said plurality of receivers, and with an antenna port.

10. An extended phone service system for communicating digital-information signals from a plurality of communication lines to a plurality of remote units, comprising:
a control processor;
packet means for generating packet data signals from a plurality of digital-information signals and a control data signal;
a plurality of transmitter means, each transmitter means responsive to a control signal from said control processor for transmitting and frequency hopping on a plurality of frequencies, the packet data signals as communication data signals;

a power combiner coupled to said plurality of transmitter means, said power combiner including a plurality of combiner striplines connected for combining power outputted from said plurality of transmitter means to an output of said power combiner;

a plurality of isolators coupled between each of said transmitters and each of said combiner striplines coupled to each of said transmitters, respectively, for isolating power outputted from said transmitters;

a plurality of high Q filters coupled between each of said transmitters and each of said isolators coupled to each of said transmitters, respectively, for filtering power outputted from said transmitters; and at least one radiax cable coupled to the output of said power combiner for radiating the frequency hopping signals to said plurality of remote units.

11. The extended phone service system as set forth in claim 10, further comprising:

a first plurality of receivers for receiving remote-data signals transmitted from said remote units;

a duplexer, with a transmitter port coupled to the output of said power combiner, with a receiver port coupled to said plurality of receivers, and with an antenna port coupled to said radiax cable; and a second plurality of receivers for monitoring the plurality of frequencies, and responsive to an interfering signal interfering on at least one of the plurality of frequencies, for generating a nonavailability signal; and wherein said control processor, responsive to the nonavailability signal, reassigns the frequency with the interfering signal at the plurality of transmitter means to a noninterfered frequency with no interference, of the plurality of frequencies.

12. The extended phone service system as set forth in claim 10, further comprising:

cyclic-redundancy-check (CRC) means coupled to said packet means and responsive to each of the packet data signals for generating a data CRC data and multiplexing the CRC data to each of the packet data signals, respectively;

error detection means located at said remote unit, responsive to the CRC data of each packet data signal, for detecting data errors and generating an error signal; and means coupled to said control processor and responsive to the error signal for retransmitting the packet data signal having an error.

13. The extended phone service as set forth in claim 10 wherein said high Q filter is a helical resonator, and said isolator is a ferrite isolator.

14. The extended phone service system as set forth in claim 10, wherein said power combiner includes a plurality of combiner striplines with each combiner stripline transforming an input impedance by a ratio of 1:2 to an output impedance, said plurality of combiner striplines connected for combining power outputted from said plurality of transmitters with impedance matching to an output of said power combiner, by having at least an output of a first combiner stripline and an output of a second combiner stripline coupled to an input of a third combiner stripline.

15. The extended phone service system as set forth in claim 10, further comprising:

a power divider with a first port coupled to the output port of said power combiner, and a plurality of divider ports, said power divider including a plurality of divider striplines with each stripline transforming a first port impedance by a ratio of 2:1 to a second port impedance, said plurality of divider striplines connected with at least a first divider stripline with a first port and a second divider stripline with a first port coupled to the output port of said power combiner; and a plurality of radiax cables coupled to said plurality of divider ports for radiating signals to said plurality of remote units.

16. The extended phone service system as set forth in claim 10, further comprising:

a plurality of receivers for receiving remote-data signals transmitted from said remote units; and a duplexer, with a transmitter port coupled to the output of said power combiner, with a receiver port coupled to said plurality of receivers, and with an antenna port.

* * * * *